United States Patent [19]

Trofimov et al.

[11] 3,887,623

[45] June 3, 1975

[54] METHOD FOR PREPARING DIVINYL SULPHIDE

[76] Inventors: Boris Alexandrovich Trofimov, ulitsa Lermontova, 321a, kv. 32; Svetlana Viktorovna Amosova, ulitsa Dekabrskikh sobyty, 105 "B", kv. 43, both of Irkutsk, U.S.S.R.

[22] Filed: Jan. 2, 1973

[21] Appl. No.: 321,055

[52] U.S. Cl. .................. 260/609 B; 260/609 R
[51] Int. Cl. ............................................. C07c 149/10
[58] Field of Search ................................. 260/609 B

[56] References Cited
UNITED STATES PATENTS
2,156,095   4/1939   Reppe et al. .................. 260/609 B Primary Examiner—Lewis Gotts
Assistant Examiner—D. R. Phillips
Attorney, Agent, or Firm—Eric H. Waters, et al.

[57] ABSTRACT

A method for preparing divinyl sulphide comprising reacting a sulphide of an alkali metal with acetylene in an aqueous or an aqueous-organic medium at a temperature up to 170°C with subsequent recovery of the divinyl sulphide product, which is useful as a monomer and a co-monomer in the manufacture of new polymeric materials, and also as an intermediate in organic synthesis.

9 Claims, No Drawings

METHOD FOR PREPARING DIVINYL SULPHIDE

This invention relates to a method for preparing divinyl sulphide which is used as a monomer and a co-monomer in the preparation of new polymeric materials, and also as a valuable intermediate in organic synthesis. Divinyl sulphide can be homopolymerized to prepare new binding agents and rubbers, self-curing rubbers including. In industry divinyl sulphide is co-polymerized with commercial rubber genes to obtain new elastomers and rubbers. Divinyl sulphide is recommended for curing commercial unsaturated latexes. Insoluble (cross-linked) homopolymers of divinyl sulphide and their oxidized modification — polydivinyl sulphoxides and polydivinyl sulphones — can be used as complexing sorbents for selective extraction of rare and noble metals from their solutions. Divinyl sulphide is also a valuable "cross-linking" agent. Divinyl sulphide, moreover, can be used for the manufacture of new antiscore and antiwear additives to oils, antioxidants for fuels and stabilizers of plastics.

Known in the art are methods for preparing divinyl sulphide, for example, by dehydrohalogenation of 2,2'-dihalodiethyl sulphides, such as yprite (2,2'-dichloridiethyl sulphide) or 2,2'-dibromodiethyl sulphide. The yield of the desired product in these methods is 42 weight percent.

The disadvantages inherent in these methods are low yields and high toxicity of the starting materials.

Also known is a method for preparing divinyl sulphide consisting in dehydration of 2,2'-dioxydiethyl sulphide with potassium sulphate or potassium hydroxide. If the process is carried out with potassium hydroxide, the reaction temperature is 195°–230°C, the amount of KOH being 2.5 mol per mol of 2,2'-dioxydiethyl sulphide. The yield of the desired product is 36 percent by weight. Along with the desired product, the process yields also such by-products as 2-methyl-1,3-oxathiolane (9–10 percent by weight), 1,4-oxathiane (7–8 percent by weight), 2-oxyethylvinyl sulphide (3.5 percent by weight) and methylvinyl sulphide (7–8 percent by weight).

The disadvantages of this method are low yield of divinyl sulphide and complexity of its purification from said byproducts. Moreover, occasional uncontrollable foaming during dehydation is another difficult encountered in realizing this process. A further disadvantage of this method is also the use of costly raw materials and high requirements for potassium hydroxide (to 2.5 mol per mol of 2,2'-dioxydiethyl sulphide).

The main objects of this invention are to increase the yields of the divinyl sulphide product, to improve its quality, to simplify the process, and to develop a new and efficient commercial method for preparing divinyl sulphide from new starting materials.

These and other objects are accomplished by the present method for preparing divinyl sulphide, which comprises reacting the sulphide of an alkali metal with acetylene in an aqueous or an aqueous-organic medium at a temperature of from room temperature up to 170°C with subsequent isolation of the desired product.

Sodium sulphide or potassium sulphide should preferably be used as the alkali metal sulphide.

The process should preferably be carried out under a pressure of up to 20 atm.

Aqueous aprotic polar solvents, such as dimethyl sulphoxide, hexamethyl phosphorus triamide, dimethyl ether of diethylene glycol or sulpholane (tetramethylene sulphone) containing water not more than 10 percent by weight should preferably be used as the aqueous-organic medium.

The process should be carried out in the presence of an alkali, preferably potassium hydroxide, taken in an amount of up to one mol per mol of the starting sulphide.

The process can be effected by introducing a metal sulphide directly into the reaction mixture, or by the preparation of the metal sulphide in situ, in the reaction mixture by reacting alkali with hydrogen sulphide with simultaneous passage of acetylene, whereby the hydrogen sulphide is fully converted to the metal sulphide.

The present invention for preparing divinyl sulphide can be realized as follows.

The sulphide of an alkali metal is reacted with acetylene in an aqueous or an aqueous-organic medium. The process scheme, wherein M is an alkali metal, is as follows.

where M is an alkali metal.

Sodium sulphide, potassium sulphide or some other cheap material should preferably be used as the alkali metal sulphide. The process can be carried out at room temperature, and with heating to 170°C. The process is substantially intensified by using compressed acetylene, and also in the presence of polar aprotic solvents, such as dimethyl sulphoxide, sulpholane, hexamethyl phosphorus triamide (hexamethanol), dimethyl ether of diethylene glycol, N,N,N',N'-tetramethylmethane phosphamide, etc. The process is also intensified by adding alkalis, for example, potassium hydroxide or sodium hydroxide (to one mol per mol of sulphide). For the sake of convenience and the safety of the process, acetylene under a pressure of not more than 20 atm is used. Under these conditions, acetylene should not be diluted with inert gases, since water vapour and the formed divinyl sulphide are good reaction-retarders themselves. The preferable concentration of water in the reaction mixture is up to 10 percent by weight.

The process can be carried out in an aqueous medium too. Divinyl sulphide is recovered from the reaction mixture by distillation, as a rule in the form of an azeotropic mixture with water (b.p., 67°C at 720 mm Hg). The prepared product is dried and distilled again to prepare divinyl sulphide having a purity of 99.8 percent and higher. The yield of the desired product is up to 82 wt.% of theory.

The process can be realized in accordance with continuous flowsheet principles by simultaneous delivery of hydrogen sulphide and acetylene into an aqueous or aqueous-organic solution of alkali. The alkali metal sulphide required for the process is in this case formed directly, in situ, in the reaction mixture. This embodiment of the present invention is especially advantageous for the large-scale production of divinyl sulphide.

The advantages of the herein proposed method are simplicity of the process, which can be carried out in a single step; mild reaction conditions (low energy requirements), the absence of waste products, due to the fact that the process utilizes hydrogen sulphide, which is a waste product in the metallurgical, petrochemical, chemical and paper-and-pulp industries; availability and cheapness of the starting materials (hydrogen sulphide and acetylene), high purity of the prepared divinyl sulphide; which is attained without the need for laborious purification, and high yields of the main product (to 82 percent by weight).

For a better understanding of the invention, reference may be had to the following examples, which illustrate its practical embodiments.

EXAMPLE 1

Into a two-litre rotating autoclave were introduced 60 g of $Na_2S.9H_2O$, 14 g of potassium hydroxide and 250 ml of water and these were heated for 5 hours at a temperature of 130°C under pressure of acetylene with rotation of the autoclave (The initial pressure of acetylene at room temperature was 18 atm.). The reaction mixture was then extracted with ethyl ether, and the extracts were dried with sodium sulphate and distilled. The resultant product had a purity of 99.9 percent. The yield of divinyl sulphide was 2.1 g (9.8 percent by weight), and the physical constants and IR spectra corresponded to those described for divinyl sulphide in the literature.

EXAMPLE 2

Into a one-litre rotating autoclave were introduced 60 g of $Na_2S.9H_2O$, 0.9 ml of water and 100 ml of dimethyl sulphoxide, and these components were heated for 4 hours at a temperature of 100°–110°C under an acetylene pressure (the initial pressure was 14 atm. and the quantity of acetylene delivered into the autoclave was 29 liters.). The yield of divinyl sulphide after distillation was 11.4 g. The purity of the product was 98.9 percent. After drying over $Na_2SO_4$ and another distillation, the purity of divinyl sulphide was 99.9 percent. The yield of pure product was 11.1 g (50.5 percent by weight).

EXAMPLE 3

Into a one-litre rotating autoclave were introduced 60 g of $Na_2S.9H_2O$, 14 g of potassium hydroxide, 9 ml of water and 100 ml or dimethyl sulphoxide; the contents of the autoclave were then heated for 4 hours at a temperature of 100°–110°C under an acetylene pressure (the initial pressure at room temperature was 17 atm., the total quantity of acetylene delivered into the autoclave was 24 litres, and the residual pressure was 2 atm). The yield of divinyl sulphide after distillation was 12.7 g (59 percent by weight).

EXAMPLE 4

Into a one-litre rotating autoclave were introduced 20 g of $K_2S.5H_2O$, 2.8 g of potassium hydroxide, 2 ml of water and 100 ml of hexamethyl phosphorus triamide; these components were heated for 8 hours with rotation at a temperature of 70°–80°C under pressure of acetylene (the initial pressure at room temperature was 18 atm). The yield of divinyl sulphide after distillation was 7.1 g (82 percent by weight). The purity of the product was 99.9 percent.

EXAMPLE 5

A solution of 20 g $K_2S.5H_2O$ and 2.8 g of potassium hydroxide in 100 ml of technical dimethyl ether of diethylene glycol (containing water to 5 percent by weight) was heated to 160°–170°C for 6 hours in a rotating one-litre autoclave under the pressure of acetylene (the initial pressure at room temperature was 17 atm). The yield of divinyl sulphide after distillation was 4.9 g (57 percent by weight). The purity of the product was 99.8 percent.

EXAMPLE 6

Through an intensively stirred mixture of 24 g of $Na_2S. 9H_2O$, 5.6 g of potassium hydroxide, 2 ml of water and 100 ml of sulpholane, crude acetylene prepared from calcium carbide was passed at a temperature of 110°C for 20 hours at a rate of about 200 ml per min.

The current of gases and vapours emerging from the reaction kettle was passed through a number of traps connected in series and cooled to −60° to −70°C. The condensate and the reaction mixture were distilled to yield 2.8 g (33 percent by weight) of divinyl sulphide, having a purity of 99.8 percent.

EXAMPLE 7

Through an energetically stirred suspension of 28 g of potassium hydroxide in 200 ml of aqueous dimethyl sulphoxide (containing not more than 10 percent by weight of water) hydrogen sulphide and acetylene were passed simultaneously at a temperature of 90°C, the rate of acetylene being in a range of 200–250 ml per minute. The mixture of gases and vapours emerging from the reactor was condensed in a system of the traps cooled by dry ice. As traps were filled with liquid, they were replaced by new ones. Divinyl sulphide was isolated by fractionating the condensate. Divinyl sulphide was prepared continuously at a rate of 0.8–1.0 g per hour. No drop in the catalytic activity of the system was observed during 20 hours of operation.

What is claimed is:

1. A method for preparing divinyl sulphide, consisting essentially in reacting, in stoichiometric amounts, an alkali metal sulphide and acetylene in a suitable solvent medium comprising an aqueous polar aprotic solvent, at a temperature of from room temperature to 170°C.

2. A method according to claim 1, wherein the alkali metal sulphide is selected from the group consisting of sodium sulphide and potassium sulphide.

3. A method according to claim 1, wherein the process is carried out under a pressure ranging from 1 atm to 20 atm.

4. A method according to claim 1 wherein the solvent medium contains a polar aprotic solvent selected from the group consisting of dimethyl sulphoxide, hexamethyl phosphorus triamide, dimethyl ether of diethylene glycol, and sulpholane, and water in an amount not more than 10 percent by weight of said solvent medium.

5. A method according to claim 1, wherein said method is carried out in the presence of alkali.

6. A method according to claim 5, wherein potassium hydroxide, taken in amount of one mol per mol of the starting sulphide, is used as said alkali.

7. A method according to claim 1, wherein the alkali metal sulphide is prepared directly in situ, in the reaction mixture by the interaction between the alkali and hydrogen sulphide.

8. A method for preparing divinyl sulphide, consisting essentially of reacting, in stoichiometric amounts, an alkali metal sulphide and acetylene in an aqueous medium.

9. A method according to claim 8 wherein said aqueous medium comprises a polar aprotic solvent and the amount of water in said medium is not more than 10 percent by weight.

* * * * *